3,495,972
METALLIC CONGLOMERATE ADAPTABLE FOR DENTAL FILLING
Lloyd Baum, Loma Linda, Calif., assignor to Loma Linda University, Loma Linda, Calif., a corporation of California
No Drawing. Filed Apr. 6, 1966, Ser. No. 540,494
Int. Cl. A61k 5/02; C22c 39/54
U.S. Cl. 75—.5                                              5 Claims

ABSTRACT OF THE DISCLOSURE

A dental filling composition consisting of a metallic conglomerate consisting essentially of indium and a material selected from the group consisting of silver, tin, gold, nickel and mixtures thereof, said conglomerate being dry and readily workable into a plastic state of ambient temperatures and thereafter setting to hardened condition.

---

This invention relates generally to metal compositions uniquely amenable to plastic manipulation in the cold and subsequent age hardening into rigid bodies. More particularly, the invention relates to such compositions having remarkably effective utility for dental cavity filling purposes.

Much of the restorative dental work now undertaken involves the filling of tooth cavities for reasons so well known as to require no recitation here. The filling materials are generally either dental amalgam or gold, the former being more commonly used because of its lower cost. Dental amalgam, so-called, is an alloy mercury, silver and tin, along with, typically, smaller amounts of copper and zinc as modifier metals. The first step in the filling of a dental cavity with amalgam is to mix the necessary ingredients (generally a powdered alloy of the silver, tin, and modifier metals and mercury, the latter being, of course, in liquid form) to a state of plasticity (typically in weight proportions of about 50% mercury and 50% powdered alloy), after which the resulting mixture is packed into the cavity, a little bit at a time, until the latter is properly filled. The packed mass is trimmed and burnished, as necessary, and it ultimately sets to form a hard preservative filling in the tooth cavity.

As will be aprpeciated by dentists and others skilled in the dental arts, cohesive gold, in specially prepared form, is packed into tooth cavities in somewhat the same way as dental amalgam. While cohesive gold requires no preliminary mixing step equivalent to that required of the dental amalgam ingredients, its relative hardness makes gold slower packing than amalgam and results in a slower over-all filling procedure for the former than the latter.

I have now found that particular combinations of solid metals, as hereinafter disclosed, are excellently suited for use as, and possessed of unique advantages over presently known, dental filling materials. More specifically, such combinations can, I have discovered, be cold-packed into dental cavities as easily and rapidly as dental amalgam, after which they harden, similarly to dental amalgam, into fillings of excellent physical and chemical suitability for the purpose. More importantly, I have found such fillings to be more effective than those made of either gold or dental amalgam in sealing dental cavities against saliva leakage.

The aforesaid combinations (hereinafter variously referred to as compositions, filling materials or by terms of similar import) all contain indium, in substantial quantity, as a key ingredient. The presence of the indium has the effect of rendering the compositions sufficiently soft, or plastic, under packing pressures to permit their condensation in dental cavities with little or no difficulty. Additionally, the presence of the indium imparts a unique cavity wall hugging capability to the filling materials, thus assuring an excellent seal between the teeth and cavity fillings and substantially preventing the possibility of saliva contact with the cavity walls. By contrast, dental amalgam has a certain amount of "rebound" when pressed against a dental cavity wall, thus making the tooth filling operation more difficult and time consuming than it would otherwise be and, at the same time, mitigating against the kind of cavity sealing effectiveness inherent in my new filling compositions. The latter, as will now be apparent, do not so rebound, but stick fast to the tooth cavity walls on first application, thus contributing to the dentist's working speed and assuring the superior cavity sealing effect of above reference, the advantages of which wil be well enough appreciated by those skilled in the dental arts to require no further comment here.

It is thus a principal object of this invention to provide a normally hard tooth filling composition which becomes plastic under condensing pressures at ambient temperatures and thereby lends itself to relatively easy packing into dental cavities.

It is another object of the invention to provide such a composition which sets to form dental filling of excellent quality.

It is yet another object of the invention to provide such a composition which readily adapts to tooth cavity walls to seal them against saliva ingress or leakage.

It is a still further object of the invention to provide such a dental filling composition which is faster and easier to pack into dental cavities, as well as being less expensive, than gold.

Other objects, features and advantages of the invention will appear in the light of its complete description to follow.

The dental filling compositions of this invention comprise combinations of indium and one or more of the metals silver, tin, nickel and gold. Optionally, the compositions can include relatively minor amounts of one or more modifier metals. Several metals are presently known as suitable modifiers for dental filling materials, among which are cadmium, zinc, copper, palladium, platinum, gallium and lead. Any of these will serve as satisfactory modifiers in the dental compositions of this invention and may be so employed within its scope. A modifier, as its name implies, serves only to modify the character (and not change the basic nature) of the filling compositions of its incorporation in such a way as to enhance their general adaptability for dental filling purposes. The identities, nature and functions of such modifiers are so well known to those skilled in the dental arts as to require no further discussion here, except, perhaps, to note that other materials, besides those specifically named above, suitable as modifiers can be employed, separately or in any combination with co-modifiers, in the filling compositions of this invention.

As will be apparent from the foregoing, the major proportions of my novel dental filling compositions are made up of indium and one or more of the metals of the group of four specifically enumerated metals above. In this connection, I have found the preferred range of indium content of the filling compositions to be between about 30 and about 60 percent, these figures representing percentages by weight expressed on a total weight basis.

As previously indicated, my tooth filling compositions become sufficiently plastic under ordinary packing pressures to enable them to be easily condensed by hand at ambient working temperatures. This is made possible by the presence of the indium, although I do not profess to completely understand the reason, or reasons, therefor. Suffice it to say that the filling compositions are somehow converted, under the influence of packing pressures, from a metallic consistency to a soft, spreadable one. Whatever the reason for this might be, the principal thing of importance is that the filling materials rapidly soften under packing pressures to permit their condensation in tooth cavities with ease and speed.

Once a cavity has been packed with the softened filling material of this invention, the latter begins to set, or harden, (probably as a result of alloy action although I am not absolutely certain what interaction occurs between the filling constituents to cause such an effect) to a state of eventual physical sufficiency for its tooth filling function, as I have ascertained by means of hardness determinations and other tests well known to dentists for the evaluation of candidate filling materials.

While, as will be seen, the dental filling compositions of this invention can exist in certain other physical forms, they are preferably intimate mixtures of their finely divided constituent metals, as exemplified by powders of minus-100-mesh, and preferably minus-325-mesh, particle size. I have discovered that such powdered metal compositions quickly react to packing, or condensation, pressures in the above-described way, that is by becoming soft, pliable, easily spreadable masses, rather than remaining granular mixtures of separably discrete particles. When so softened, the metal mixtures readily lend themselves to condensation in dental cavities, after which they harden into excellently suitable fillings, all as previously disclosed. This unique metamorphosis of the filling compositions under packing pressures from a powdery metallic state to a soft, plastic consistency sets the materials apart from conventional fillers and avoids any necessity for use of a liquid softening ingredient, and the problems there attendant, such as the mercury ingredient of dental amalgam.

The preferred way, presently contemplated, of utilizing the filling compositions of this invention is to compress small quantities thereof into pellets with a suitable plunger, of any well-known type, and pack the resulting pellets, one at a time, into a dental cavity. The pellets should, of course, be of a convenient size to permit the gradual build-up of a filling within the tooth cavity. The pelleting pressure need be only sufficient to insure adequate adherence of the individual metal particles to permit subsequent transference of the pellets to a dental cavity without fragment loss. An alternative way of initially pelleting the filling compositions, and particularly those of higher indium content, to prepare them for subsequent packing, as described, is to subject them to the action of a mechanical dental amalgamator.

The primary purpose of the above-described pelleting step is to render the filling material easier to handle for cavity packing purposes, but it has a triggering effect on whatever interaction takes place between the metal constituents of the material to effectuate its softening and subsequent hardening when packed as taught herein. This "triggering effect" is, in a sense, a fringe benefit in that it results in a presoftening of the filling material to make its subsequent packing easier. On the other hand the triggering effect is of some disadvantage in that it rules out the feasibility of pelleting the material much prior to the time it is actually needed for dental work because of the danger of interaction of its components and premature hardening of the resultant pellets.

As previously indicated, the preferred range of indium content for the dental filling compositions of this invention is from about 30 to about 60 percent by weight. The reason for the lower limit is that the mixtures get increasingly stiffer and less plastic, or pliable, during packing as the indium content drops below 30 percent. The reason for the upper limit is that excesses of indium over 60 percent result in mixtures which are too soft and yielding under condensation pressures for most effective dental filling use.

Of the class of metals constituting all critical ingredients of my dental filling compositions except indium, silver and silver plus tin, with the silver in greater amount, are preferred for use in the composition mixtures. Silver owes its preferred status as an ingredient of the filling compositions to the fact that its mixtures with indium are workable throughout a relatively wide range of indium: silver weight ratios and the additional fact that fillings representative of all such mixtures, regardless of their constituent weight ratios, are of undeviatingly high quality. This I have verified by testing simulated fillings made from mixtures of powdered indium and silver in differing weight ratios for hardness and crushing strength. The weight ratios of indium to silver in the simulated fillings thus tested were 1:1, 1¼:1, 1½:1, 2:1, 1:1¼, 1:1½, and 1:2, respectively.

The hardnesses of the simulated fillings were measured with a Kentron Micro Hardness Tester, this being the commercial name of a hardness testing device manufactured and sold by Rhiele Instrument Corporation. The results of these tests showed the fillings to differ little among themselves in hardness and to be somewhat softer than amalgam fillings, but slightly harder than gold ones. This evidences a hardness level for the indium-silver mixtures well within the range of suitability for dental filling purposes clearly established by the hardness characteristics of cohesive gold and dental amalgam, the undisputed leaders among presently known filling materials. The simulated indium-silver fillings, as well as others subsequently to be described, were found fairly comparable to dental amalgam in crushing strength. While the ultimate hardnesses of the above-described mixtures were, as indicated, relatively close, the mixtures were found to vary noticeably in plasticity under packing pressures, the plasticity, or softness, increasing generally in proportion to the indium content, the higher the latter, the softer the resulting mixture.

While, as indicated above, pure indium-silver mixtures are excellently suited for dental filling use in accordance with this invention, I have found that the inclusion of tin in the formula renders the packed material generally harder setting and hence, at least in certain instances, superior to the pure indium-silver mixtures for dental filling purposes. In this connection, of all formulations which I have so far compounded and tested, the preferred one (disregarding modifiers, and their noncritical impact on the properties of the filling materials) was found to contain 40% indium, 40% silver and 20% tin. I have, as will presently be discussed in greater detail, carried out a program of extensive investigation of this formulation, and filled numerous types of human dental cavities therewith, all with remarkably successful result.

The aforesaid formulation consists of an intimate mixture of powdered indium, silver and tin in the proportions 40, 40 and 20 percent by weight, respectively, and will hereinafter, for the sake of brevity, be referred to as the 40, 40, 20 filler. The metal components of the 40, 40, 20 filler are initially present in separately powdered, rather than powdered alloy, form (although alloys of some or all of the non-indium ingredients of this, or other of my filling compositions, can be initially present in powdered form, if desired, within the scope of the present invention). While the 40, 40, 20 filler represents, as indicated, a preferred formulation of my novel filling material, it is, in a larger sense, representative of a preferred class of indium-silver-tin mixtures containing, in addition to the above-indicated quantities of indium and silver, varying quantities of tin within the range from about 10 to about 20 parts by weight.

Indium is nontoxic to living animal tissues, a fact I have verified by a study of the literature, including reference disclosures of the use of indium in dental alloys (such usage being, however, in no wise similar to mine). Furthermore, indium is relatively inert, a necessary quality for its role as a dental filling component of my new dental filling compositions. In addition to making a literature study on the toxicological effect, or, more accurately, the lack of such effect, of indium on animal tissues, I have supervised appropriate histological tests on animals, the results of which were found to completely substantiate the literature-based conclusion of indium's nontoxicity. Finally, as indicated previously, a number of human dental cavities, including one of my own, were packed with indium-containing filling mixtures in accordance with this invention and thereafter observed over extended periods of time. In no case was the slightest evidence of toxicity, or any other harmful or deleterious effect, observed in any experimental animal or human patient. Following are more detailed descriptions of the above-discussed toxicological experiments and clinical studies.

Example I

In this example, a six-month old dog, weighing 18 kg., with newly erupted permanent teeth was selected for the emplacement of indium-silver and conventional dental amalgam fillings in cavities in corresponding teeth either side of its jaw. The object was to observe the histological effect of the indium-silver on the dog's dental pulp in direct comparison with the effect of dental amalgam thereon. A young dog, with teeth in the formative stage, was chosen for this work since any such histological effect would be more readily detectable in the dental tissue of such an animal than in the tissue of a fully matured dog. The 40, 40, 20 filler was employed as the indium-sliver filling material of this example and the dental amalgam was prepared by mixing about equal weight proportions of mercury and a silver alloy containing 65% silver, about 27% tin, about 6% copper and about 2% zinc, all percentages being given by weight.

The dog was anesthetized and subjected to dental surgery followed by dental restoration, subsequent to which its restored teeth were extracted and examined histologically. Extraction of the teeth was done serially over a period beginning about two weeks after completion of the dental restoration work and running for about six weeks thereafter. Pertinent details of the over-all procedure are given below:

(1) Anesthesia—35 mg./kg. Nembutol—I.V.
(2) Surgery preparation of Class V simulated cavities. 18 teeth on each side were prepared.
  (a) Left side restored with amalgam.
  (b) Right side restored with In/Ag—Total, 36 restorations were placed.
  (c) All preparations approximate each other in size and shape on contralateral teeth of the same arch.
  (d) Depth of a #35 bur.
  (e) Air turbine with $H_2O$ coolaut used in preparation.
(3) Serial extraction of contralateral teeth.
(4) Fixation of teeth
  (a) 10 percent formalin.
  (b) ⅓ apex of root snipped to allow entrance of fixer.
(5) Histologic section and examination, microscopic study showed tissue was accepted equally by both metals.

The results of this example unequivocally demonstrate a complete lack of toxicological effect from either the dental amalgam or indium-silver filling material on the living dental tissue of the experimental dog. Stating it another way, the indium-silver filling material was no more toxicological than the dental amalgam, which latter is known with certainty, from long usage as a dental restorative material, to be completely nontoxic to living dental tissue.

Example II

In this example, a series of paired-specimen tissue implants of indium-silver filling material and dental amalgam were subcutaneously made near tne shoulders of each of 15 young rats averaging 120 grams in weight. The implanted specimens were serially removed from the rats over a period of about a month, commencing 3 days after completion of the implantation surgery, at 3 day intervals until the supply of animals was exhausted. The specimen-surrounding tissue of each animal was then examined histologically. The indium-silver and dental amalgam specimen materials were of the same respective compositions as the indium-silver and dental amalgam filling materials of Example I. Pertinent details of the involved procedures are briefly summarized below.

Anesthesia was accomplished with I. P. Nembutol, 35 mg./1 kg. The hair was then clipped off widely over the shoulder area on each side. This area was then soaped and shaved with a safety razor. The area was then dried and surgical scrub made and was wiped with 70% isopropylalcohol and dried with sterile towel. The animal was then draped with sterile drape and incision made over the scapula away from the midline, one on either side. Depth, subcutaneous as to allow implantation of metal cylinders. Sterile metal cylinders were placed in each animal, In/Ag—right side, silver amalgam left side. Specimens measured 1 mm. long by 3 mm. diameter.

This experiment with tissue implants was conducted during October 1965. The tissue was taken which contained the metal cylinders and fixed in 10% formalin solution and sent out for histologic sectioning. H. & E., stained. On examination it was revealed that the reaction of the tissue was imperceptibly similar, with good fibro blastic and fibrous tissue formation occurring around the metal cylinders of each material.

In this experiment each animal had both metal cylinders implanted in it, which made each animal its own control.

The results of the above-described work conclusively demonstrate an absence of toxic effect on living animal tissue from the presence of my indium containing filling material in direct contact therewith. Here, as in the case of the Example I work, young animal tissue was chosen for experiment to aggravate, and render more easily detectable, any toxicological effect which might conceivably show up under the test conditions.

The results of the experimental work of Examples I and II having verified the lack of toxicity in my dental filling materials indicated by the previously made literature survey, a program of clinical work on human dental patients was next completed. More specifically, a plurality of dental cavities of both simple and complex character (more than 20 in all), in twelve patients, were serially packed with the aforesaid 40, 40, 20 filler over a a period of several months time. The resulting dental fillings have been kept under observation and have to date proven their worth in service without an exception of any sort. Furthermore, there is no present indication that any of the fillings will not continue to give good service. About two-thirds of the filling were finished with a gold veneer, or facing, (of a type subsequently to be discussed in greater detail) and the remaining third were trimmed and burnished in the usual way dental amalgam fillings are finished off.

As indicated above, the here-involved cavities were of both simple and complex character. Some of the cavities were so situated as to require fillings with chewing surfaces, the remainder, of course, having openings in nonchewing tooth surfaces. Continued observation of the resulting fillings has, as indicated above, shown excellent adaptation of each to its cavity environment, as well as an excellent record of performance and serviceability in each case. Moreover, none of the restored teeth has manifested any post-operative sensitivity, a common occurrence in teeth filled with gold or amalgam. While I am not certain that such is the case, it is my belief that the lack of sensitivity is the result of the superior cavity sealing effectiveness, previously discussed in some detail, of my new dental filling materials.

As will be apparent from the foregoing, the clinical work undertaken with my filling material was completely successful in every respect and there was no single instance of patient dissatisfaction with his new filling, or fillings, thus attesting to the unique effectiveness of said filling material. A part of the material's effectiveness was attributable, as will be clear from the foregoing, to its cavity sealing ability, the superiority of which over that of the leading dental filling materials of present usage I have demonstrated by means of two microleakage tests, employing radioactive calcium as a tracer element, run on fillings prepared from 40, 40, 20 filler, gold and dental amalgam, respectively, at two and three week intervals after the filling preparation date. The test results showed the 40, 40, 20 filler to be a far superior cavity sealer than either the gold or dental amalgam.

Various advantageous features of the filling compositions of this invetnion, including certain of their points of superiority over gold and dental amalgam for tooth filling purposes, have been discussed at some length above. One such feature has not yet been mentioned, however, this being a complete compatability of the subject materials with gold. While such gold compatibility is, of course, true of all of my novel filling compositions, its utilitarian significance is perhaps most effectively demonstrated through the medium of those compositions least like gold in character and appearance such as, for example, the 40, 40, 20, and other high-silver-content, compositions.

In the above connection, my new filling materials bond so well with gold when condensed in layers therewith that the individual layers will normally rupture under applied stress before any of the bonds will break, a result believed largely attributable to the presence of the indium in the laminated structure. It is, accordingly, possible to pack the greater part of a dental cavity with a filling material in accordance with this invention, and then face that part of the filling exposed by the cavity opening with a veneer of gold by condensing the gold directly thereonto. By this means, a filling with the surface characteristics, and some of the strength (resistance to compression), of packed gold is achievable at a cost significantly below that of a gold filling. Such gold-faced fillings are, as dentists will appreciate, impossible of achievement with dental amalgam because of the incompatability of the mercury component of that material with gold, mercury being known to infuse with gold and make it brittle, bleed through it, etc.

It is not, of course, critically necessary to employ gold facings on the fillings of this invention, but their presence is often desirable in the case of fillings subject to mascatory pressures, since the setting, or hardening, of my filling material normally continues for a period of at least several days during which the presence of a protective crust of relatively hard gold on a surface subject to chewing stresses is of obvious benefit. While, as indicated above, the hardening period of my packed fillings is normally of several days' duration (actually requiring, I believe, two or three weeks for substantial completion), I have determined that my filling material is sufficiently firm for service, without the benefit of a protective coating of any sort, in nonmascatory tooth sites, such as gum line cavities, immediately upon packing, The compositions of this invention have been herein described in what is conceived to be their most practical and preferred form, namely, as intimate mixtures of relatively pure metals, each in finely divided state. It should be understood, however, that the compositions are capable of existence in other forms, such as, for example, mixtures of the type previously mentioned containing finely divided alloys of filling ingredients other than indium or, in fact, mixtures containing certain alloys of indium in finely divided form. In this connection, and as will now be apparent, the quintessence of my invention consists in the bringing together of certain metals, one of which is indium, in *solid* form in such relative proportions and physical intimacy, and under such interacting potential, as to assure the initial softening, and subsequent hardening, of the resulting conglomerate material when packed as taught herein.

In clarification of the foregoing, a critical necessity of all conglomerates (using that term in its contextually obvious meaning) of this invention is that they contain discrete particles or bodies of indium, and/or indium-containing alloy, and one or more (in separate or alloyed form) of the metals silver, tin, gold and nickel. Some, or all, of the formerly mentioned (indium and/or indium-containing) particles or bodies must be of different composition than some or all of the latterly mentioned ones. More specifically, there must be particles or bodies of at least two different metallic compositions in the conglomerate which are capable of undergoing the above-mentioned softening and subsequent hardening transition under the applicable working conditions taught herein.

While the description of my dental filling compositions (or conglomerates, to use the above-introduced term of broader import) has been heretofore focussed on specific formulations for purposes of best illustration, I have made sufficient investigation of the various other formulations within the purview of my invention to determine the operability of all for use as taught herein. Conglomerates of other than the preferred finely divided variety which react to dental packing pressures in the same way as the latter, and subsequently harden to suitable dental filling hardness levels, are, of course, valid species of my invention. An example of one such conglomerate comprises pellets of powdered silver or gold wrapped in indium foil where such pellets satisfy all of the necessary criteria for inclusion within my class of novel dental compositions.

Needless to say, the novel compositions of this invention, while generally referred to above as filling, or dental filling materials, or by terminology suggestive of dental filling usage, are not limited to such usage and they can be employed in any capacity for which their unique properties suit them. It should be emphasized, in this connecton, that where non-dental usage of such a composition is contemplated, a higher, or lower, degree of hardness in the packed and aged material than might be acceptable for dental filling purposes can be tolerated within the scope of my invention. Moreover, where the use of the packed and finally hardened material is for other than dental filling purposes, metal components which are, or might be, for one reason or another, unsuitable ingredients of dental fillings can be present.

My invention has been described in considerable detail in order to comply with the legal requirements for a full public disclosure of at least one of its preferred embodiments. However, as has already been made clear, there are other embodiments of the invention not specifically disclosed which can be prepared and used in accordance with present teachings. It is emphasized, in final summary, that all such embodiments which maintain a physical and chemical affinity, and functioning capability, consistent with the integrity of my invention as taught herein fall within its scope.

I claim:

1. A metallic conglomerate consisting essentially of indium and a material selected from the group consisting of silver, tin, gold, nickel and mixtures thereof, the indium being unalloyed and present in an amount within the range from about 30 to about 60 percent by weight of the whole and the involved metals being respectively present as finely divided particles in a state of inimate dry admixture, said conglomerate being readily workable into a plastic state at ambient temperatures and thereafter setting to a hardened condition.

2. A metallic conglomerate in accordance with claim 1 in which the material selected from the group consisting of silver, tin, gold, nickel and mixtures thereof is silver.

3. A metallic conglomerate in accordance with claim 1 made up of about 40 parts by weight of indium, about 40 parts by weight of silver and about 20 parts by weight of tin, all metals being present in nonalloyed form.

4. A metallic conglomerate in accordance with claim 1 in which said finely divided particles are of minus-100-mesh size.

5. A metallic conglomerate in accordance with claim 1 in which said finely divided particles are of minus-325-mesh size.

References Cited

UNITED STATES PATENTS

| | | | |
|---|---|---|---|
| 1,934,730 | 11/1933 | Murray et al. | 75—173 |
| 2,438,967 | 4/1948 | Ellsworth | 75—165 |
| 2,585,393 | 2/1952 | Lyle | 75—134 |
| 2,717,840 | 9/1955 | Bosch | 75—175 |

FOREIGN PATENTS 359,014 10/1931 Great Britain.

OTHER REFERENCES

Product Engineering, October 1943, pp. 630–632.

L. DEWAYNE RUTLEDGE, Primary Examiner

T. R. FRYE, Assistant Examiner

U.S. Cl. X.R.

32—15; 75—134; 264—111